United States Patent
Tsukihara et al.

(10) Patent No.: US 12,440,901 B2
(45) Date of Patent: Oct. 14, 2025

(54) CUTTING TOOL

(71) Applicant: Sumitomo Electric Industries, Ltd., Osaka (JP)

(72) Inventors: Nozomi Tsukihara, Osaka (JP); Haruyo Fukui, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 19/102,525

(22) PCT Filed: Mar. 19, 2024

(86) PCT No.: PCT/JP2024/010807
§ 371 (c)(1),
(2) Date: Feb. 10, 2025

(87) PCT Pub. No.: WO2025/196964
PCT Pub. Date: Sep. 25, 2025

(65) Prior Publication Data
US 2025/0296154 A1    Sep. 25, 2025

(51) Int. Cl.
*B23B 27/14* (2006.01)
(52) U.S. Cl.
CPC ........ *B23B 27/148* (2013.01); *B23B 2200/36* (2013.01)
(58) Field of Classification Search
None
See application file for complete search history.

(56) References Cited

U.S. PATENT DOCUMENTS

2007/0269610 A1  11/2007  Fukui et al.
2018/0326501 A1* 11/2018  Ogami ............... B23C 5/16

FOREIGN PATENT DOCUMENTS

| CN | 111074223 A |   | 4/2020 |   |
|---|---|---|---|---|
| EP | 4083254 A1 | * | 11/2022 | ......... C23C 14/0641 |
| JP | 2017-154200 A |   | 9/2017 |   |
| JP | 2017-193004 A |   | 10/2017 |   |
| JP | 2019-072818 A |   | 5/2019 |   |
| JP | 2021-192931 A |   | 12/2021 |   |
| WO | 2006/070730 A1 |   | 7/2006 |   |

OTHER PUBLICATIONS

Written Opinion mailed on May 21, 2024, received for PCT Application PCT/JP2024/010807, filed on Mar. 19, 2024, 6 pages including English Translation.

* cited by examiner

*Primary Examiner* — Elizabeth Collister
(74) *Attorney, Agent, or Firm* — XSENSUS LLP (57) ABSTRACT

A cutting tool, comprising a substrate and a coating disposed on the substrate,
wherein the coating comprises a first layer,
the first layer consists of an alternate layer in which a first unit layer and a second unit layer are alternately stacked,
the first unit layer is composed of $Al_a Ti_{(1-a-b)} Si_b N$,
the second unit layer is composed of $Al_c Cr_{(1-c-d)} Cu_d N$,
the a, the b, the c, and the d satisfy
$0.50 \leq a \leq 0.75$,
$0.005 \leq b \leq 0.20$,
$0.50 \leq c \leq 0.85$, and
$0.005 \leq d < 0.10$,
an average thickness of the first unit layer is 2 nm or more and 50 nm or less, and
an average thickness of the second unit layer is 2 nm or more and 50 nm or less.

8 Claims, 4 Drawing Sheets

CUTTING TOOL

CROSS-REFERENCE TO RELATED APPLICATION

This application is a national stage application, pursuant to 35 U.S.C. § 371, of International Patent Application No. PCT/JP2024/010807, filed Mar. 19, 2024, the entire contents of which are incorporated herein by reference.

TECHNICAL FIELD

The present disclosure relates to a cutting tool.

BACKGROUND ART

Cutting tools comprising a substrate and a coating disposed on the substrate have been used for cutting and machining until now (PTL 1).

CITATION LIST

Patent Literature

PTL 1: WO 2006/070730

SUMMARY OF INVENTION

A cutting tool of the present disclosure is a cutting tool, comprising a substrate and a coating disposed on the substrate,
wherein the coating comprises a first layer,
the first layer consists of an alternate layer in which a first unit layer and a second unit layer are alternately stacked,
the first unit layer is composed of $Al_aTi_{(1-a-b)}Si_bN$,
the second unit layer is composed of $Al_cCr_{(1-c-d)}Cu_dN$,
the a, the b, the c, and the d satisfy
  $0.50 \leq a \leq 0.75$,
  $0.005 \leq b \leq 0.20$,
  $0.50 \leq c \leq 0.85$, and
  $0.005 \leq d < 0.10$,
an average thickness of the first unit layer is 2 nm or more and 50 nm or less, and
an average thickness of the second unit layer is 2 nm or more and 50 nm or less.

DETAILED DESCRIPTION

Problem to be Solved by the Present Disclosure

Materials to be cut have been diversified in recent years, and nickel-based alloys referred to as difficult-to-cut materials have been increasingly cut especially in the aircraft and medical fields. Continuous machining of nickel-based alloys with cutting tools increases the cutting edge temperature to high temperature, and reduces the life of the cutting tools. Accordingly, cutting tools have been desired that can have a long tool life especially even in high-efficiency machining of nickel-based alloy.

Thereupon, an object of the present disclosure is to provide a cutting tool that can have a long tool life especially even in high-efficiency machining of nickel-based alloy.

Advantageous Effect of the Present Disclosure

The present disclosure enables providing a cutting tool that can have a long tool life especially even in high-efficiency machining of nickel-based alloy.

DESCRIPTION OF EMBODIMENTS

Embodiments of the present disclosure are first enumerated for description.

(1) A cutting tool of the present disclosure is a cutting tool, comprising a substrate and a coating disposed on the substrate,
wherein the coating comprises a first layer,
the first layer consists of an alternate layer in which a first unit layer and a second unit layer are alternately stacked,
the first unit layer is composed of $Al_aTi_{(1-a-b)}Si_bN$,
the second unit layer is composed of $Al_cCr_{(1-c-d)}Cu_dN$,
the a, the b, the c, and the d satisfy
  $0.50 \leq a \leq 0.75$,
  $0.005 \leq b \leq 0.20$,
  $0.50 \leq c \leq 0.85$, and
  $0.005 \leq d \leq 0.10$,
an average thickness of the first unit layer is 2 nm or more and 50 nm or less, and
an average thickness of the second unit layer is 2 nm or more and 50 nm or less.

The present disclosure enables providing a cutting tool that can have a long tool life especially even in high-efficiency machining of nickel-based alloy.

(2) In the above-mentioned (1), the b and the d may satisfy the relationship: $b/d \geq 1$. This further improves the tool life.

(3) In the above-mentioned (1) and (2), in the first unit layer and the second unit layer adjacent to the first unit layer, the ratio $\lambda 1/\lambda 2$ of the thickness of the first unit layer $\lambda 1$ to the thickness of the second unit layer $\lambda 2$, may be more than 1.0. This further improves the tool life.

(4) In any of the above-mentioned (1) to (3), the first layer may have a thickness of 0.5 μm or more and 10 μm or less. This further improves the tool life (5) In any of the above-mentioned (1) to (4), the coating may further comprise a second layer disposed between the substrate and the first layer, and the second layer is composed of a first compound
consisting of at least one element selected from a first group consisting of Group 4, 5, and 6 elements in the periodic table, aluminum, and silicon or
consisting of at least one element selected from the first group and at least one element selected from a second group consisting of carbon, nitrogen, oxygen, and boron.

This further improves the tool life (6) In any of the above-mentioned (1) to (5), the coating may further comprise a third layer disposed on the opposite side of the first layer to the substrate, and the third layer is composed of a second compound consisting of at least one element selected from the first group consisting of Group 4, 5, and 6 elements in the periodic table, aluminum, and silicon or consisting of at least one element selected from the first group and at least one element selected from the second group consisting of carbon, nitrogen, oxygen, and boron.

This further improves the tool life.

(7) In any of the above-mentioned (1) to (6), the coating may have a thickness of 0.5 μm or more and 12 μm or less. This further improves the tool life.

(8) In any of the above-mentioned (1) to (7), the substrate may comprise a cemented carbide, a cermet, cubic boron nitride sintered material, diamond sintered material, high-speed steel, or a ceramic. This further improves the tool life.

Details on Embodiments of the Present Disclosure

With reference to drawings, specific examples of the cutting tool of the present disclosure will be described below. In the drawing of the present disclosure, the same reference signs indicate the same parts or equivalent parts. The dimensional relationships among the length, the width, the thickness, the depth, and the like, are appropriately modified for clarifying and simplifying the drawings, and do not necessarily show the actual dimensional relationships.

In the present disclosure, an expression in the form "A to B" means that the upper and lower limits of the range (namely A or more and B or less). If no unit is added to A, and a unit is added to only B, the unit of A is the same as the unit of B.

If, in the present disclosure, the atomic ratio of a compound and the like expressed in a chemical formula is not particularly limited, shall include all the conventionally known atomic ratios, and should not be necessarily limited to only the ratio(s) in the stoichiometric range.

In the present disclosure, one or more numerical values are described as each of the lower limit and the upper limit of the numerical range, the combination of any one numerical value described as the lower limit and any one numerical value described as the upper limit shall also be disclosed Embodiment 1: Cutting Tool As shown in FIGS. 1 to 4, a cutting tool according to an embodiment of the present disclosure (hereinafter also described as Embodiment 1) is a cutting tool 1, comprising a substrate 2 and a coating 3 disposed on substrate 2, wherein coating 3 comprises a first layer 13, first layer 13 consists of an alternate layer in which first unit layers 12 and second unit layers 15 are alternately stacked, first unit layers 12 are composed of $Al_aTi_{(1-a-b)}Si_bN$, second unit layers 15 are composed of $Al_cCr_{(1-c-d)}Cu_dN$, the a, the b, the c, and the d satisfy 0.50≤a≤0.75.

0.005≤b≤0.20, 0.50≤c≤0.85, and 0.005≤d<0.10, an average thickness of first unit layers 12 is 2 nm or more and 50 nm or less, and an average thickness of second unit layers 15 is 2 nm or more and 50 nm or less.

The cutting tool of Embodiment 1 can have a long tool life especially even in high-efficiency machining of nickel-based alloy. It is conjectured that the reason therefor is as follows The first unit layer is composed of $Al_aTi_{(1-a-b)}Si_bN$. Aluminum (Al) contained in the first unit layer improves the hardness at high temperature of the first unit layer. If the above-mentioned a is 0.50 or more, the hardness at high temperature and the heat resistance of the first unit layer are improved. If the above-mentioned a is 0.75 or less, the production of hexagonal crystals is suppressed, and a deterioration in the hardness at high temperature of the first unit layer is suppressed.

Titanium (Ti) contained in the first unit layer improves the strength at high temperature of the first unit layer. The above-mentioned (1-a-b) is 0.05 or more.

This enables obtaining the effect of improving the strength at high temperature. The above-mentioned (1-a-b) is 0.495 or less. Since this enables securing the contents of aluminum and silicon in the first unit layer sufficiently, the hardness at high temperature, the oxidation resistance, the heat resistance, and the hardness of the first unit layer are improved.

Silicon (Si) contained in the first unit layer improves the oxidation resistance and the heat resistance of the first unit layer. If the above-mentioned b is 0.005 or more, the oxidation resistance of the first unit layer is improved. Crystal grains in the first unit layer are micronized to improve the hardness of the first unit layer. If the above-mentioned b is 0.20 or less, a deterioration in the toughness of the first unit layer is suppressed, and occurrence of chipping is suppressed.

The second unit layer is composed of $Al_cCr_{(1-c-d)}Cu_dN$. Aluminum (Al) contained in the second unit layer improves the hardness at high temperature of the second unit layer. If the above-mentioned c is 0.50 or more, the hardness at high temperature and the heat resistance of the second unit layer are improved. If the above-mentioned c is 0.85 or less, the production of hexagonal crystals is suppressed, and a deterioration in the hardness at high temperature of the second unit layer is suppressed.

If chromium (Cr) and aluminum are contained in the second unit layer, the heat resistance and the oxidation resistance at high temperature of the second unit layer are improved.

Copper (Cu) contained in the second unit layer is low soluble in chromium that is a component of nickel-based alloy (in the case where nickel-based alloy is nickel-chromium alloy). Therefore, the second unit layer containing copper scarcely adheres to material to be cut comprising nickel-based alloy during cutting. The second unit layer containing copper have high lubricity and oxidation resistance.

Since copper does not form a nitride, copper meanwhile tends to break the crystal lattice of the coating comprising a nitride to reduce the film hardness. A technique for adding copper to an AlCrN film was not therefore adopted in the past. If silicon is added to an AlCrN film besides copper to suppress a deterioration in hardness due to the addition of the copper, the solid solution amount of aluminum decreases, and the film hardness tends to be reduced. As a result of intensive research, the present inventors have found that the addition of silicon to the first unit layer enables improving the hardness of the first unit layer, the addition of copper to the second unit layer enables improving the lubricity, the adhesion resistance, and the oxidation resistance of the coating, and stacking the first unit layer and the second unit layer enables all the first layers to improve in the hardness, the lubricity, the adhesion resistance, and the oxidation resistance in a balanced manner.

The first layer consists of the alternate layer in which the first unit layer and the second unit layer are alternately stacked. The composition and crystal lattices are discontinuous on the interfaces between the first unit layer and the second unit layer. If cracks occur from the surface of the coating during cutting, the interfaces therefore enable suppressing the progress of the cracks. Accordingly, the chipping and the breakage are suppressed, and the life of the cutting tool is further extended.

As mentioned above, the first unit layer has high hardness at high temperature and heat resistance due to aluminum, strength at high temperature due to titanium, and high oxidation resistance, heat resistance, and hardness due to silicon. The second unit layer has high hardness at high temperature and heat resistance due to aluminum, high oxidation resistance and heat resistance due to chromium, and high lubricity, adhesion resistance, and oxidation resistance due to copper. The first layer of Embodiment 1 has the above-mentioned excellent characteristics of the first unit layer and the second unit layer, and the cutting tool can have a long tool life even in high-efficiency machining of nickel-based alloy, in which the cutting edge is likely to be at high temperature during cutting.

<Cutting Tool>

As shown in FIGS. 1 to 4, cutting tool 1 according to Embodiment 1 comprises substrate 2 and coating 3 disposed on substrate 2. Coating 3 may cover the entire surface of substrate 2. Even though coating 3 does not cover part of substrate 2 or even though coating 3 has portions with different structures, the cutting tool does not depart from the scope of the present embodiment. Coating 3 may cover at least the portion of substrate 2 participating in cutting. In the present disclosure, the portion of substrate 2 participating in cutting depends on the size or the shape of substrate 2, and means a region surrounded by the cutting edge ridgeline thereof and a virtual plane wherein the distance from the cutting edge ridgeline to substrate 2 along a perpendicular line of a tangent line of the cutting edge ridgeline is, for example, any of 5 mm, 3 mm, 2 mm, 1 mm, and 0.5 mm in substrate 2.

The cutting tool of Embodiment 1 can be suitably used as cutting tool 1 such as a drill, an end mill, an indexable cutting insert for drills, an indexable cutting insert for end mills, an indexable cutting insert for milling, an indexable cutting insert for lathe-turning, a metal saw, a gear-cutting tool, a reamer, or a tap.

<Substrate>

Any conventionally known substrate is usable. For example, the substrate may comprise any of cemented carbides (such as WC-based cemented carbide, cemented carbide containing WC and Co, cemented carbide in which a carbonitride of Ti, Ta, Nb, or the like is added to WC and Co), cermets (containing TiC, TiN, TiCN, and the like as the main ingredients), high-speed steel, ceramics (such as titanium carbide, silicon carbide, silicon nitride, aluminum nitride, and aluminum oxide), cubic boron nitride sintered material, or diamond sintered material.

Especially, the substrate may be WC-based cemented carbide or a cermet (especially TiCN-based cermet). WC-based cemented carbide or the cermet have hardness and strength, especially at high temperature, in an excellently balanced manner. If WC-based cemented carbide or the cermet is used as the substrate of the cutting tool, the material can contribute to the expansion of the life of the cutting tool.

<Coating>

<<Structure of Coating>>

The coating of Embodiment 1 comprises the first layer. The coating covers the substrate, and therefore has the action of improving various characteristics of the cutting tool such as abrasion resistance and chipping resistance, resulting in extending the life of the cutting tool. The coating can comprise other layers besides the first layer. Examples of the other layers include the second layer disposed between the substrate and the first layer and the third layer disposed on the opposite side of the first layer to the substrate.

<<Thickness of Coating>>

The thickness of the coating may be 0.4 μm or more and 20 μm or less, 0.5 μm or more and 12 μm or less, 1 μm or more and 10 μm or less, or 2 μm or more and 8 μm or less. If the thickness of the coating is 0.5 μm or more, the life of the cutting tool can be further extended. Meanwhile, if the entire thickness of the coating is 12 μm or less, the coating is less likely to chip during the early stage of cutting, the life of the cutting tool can be further extended.

The thickness of the coating is measured by observing the cross section of the coating through a scanning electron microscope (SEM). A specific measuring method is as follows. A cutting tool is cut in the direction along the normal line of the principal surface of the coating to provide a sectional sample. The sectional sample is observed through an SEM. The observation magnification is set at 5000 to 10000, and the measurement visual field is set at 100 to 500 μm². The thicknesses at three points of the coating are measured in one visual field, and the average value of the thicknesses at the three points is calculated. The average value corresponds to the thickness of the coating. The thicknesses of the layers described below are measured in the same method unless otherwise specified.

<<Crystal Structure of Coating>>

The coating may have a cubic crystal structure. If the coating may have a cubic crystal structure, the hardness of the coating is improved. The layers (for example, the first layer, the third layer, and the second layer) in the coating have cubic crystal structures. The crystal structures of the coating and the layers in the coating can be analyzed with an X-ray diffractometer, which is known in the art.

<<Hardness of Coating>>

The coating may have a hardness of 30 GPa or more and 50 GPa or less, or 35 GPa or more and 45 GPa or less. In this case, the coating has a sufficient hardness.

The hardness of the coating is measured by the nanoindenter method (measuring apparatus: ENT-1100a, which is available from ELIONIX INC.). The hardnesses at ten points on the surface of the coating are specifically measured at a measurement load of 10 mN (1 gf) by the method in accordance with ISO 14577 to calculate the average value of the hardnesses at the ten points. The average value corresponds to the hardness of the coating.

<First Layer>

The first layer of Embodiment 1 consists of an alternate layer in which the first unit layer and the second unit layer are alternately stacked. A thin section sample including the cross section of the coating can be observed through a TEM (transmission electron microscope) to confirm that the first layer consists of an alternate layer in which the first unit layer and the second unit layer are alternately stacked by the contrast difference.

Figure 1:
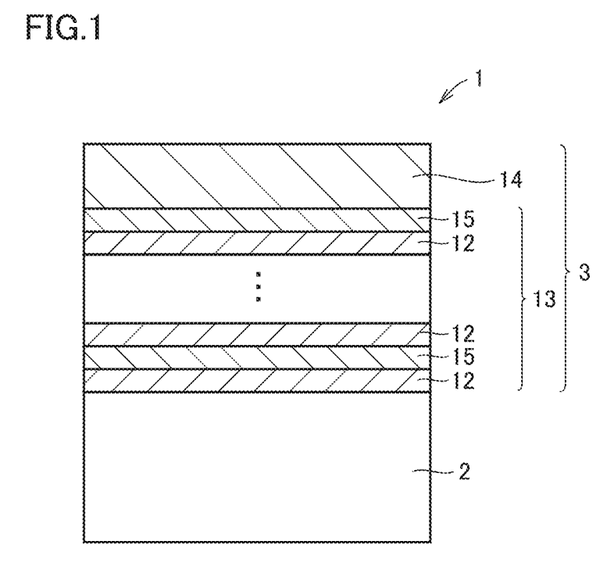
FIG. 1 is an enlarged schematic sectional view of an examples of a cutting tool according to Embodiment 1.
Figure 2:
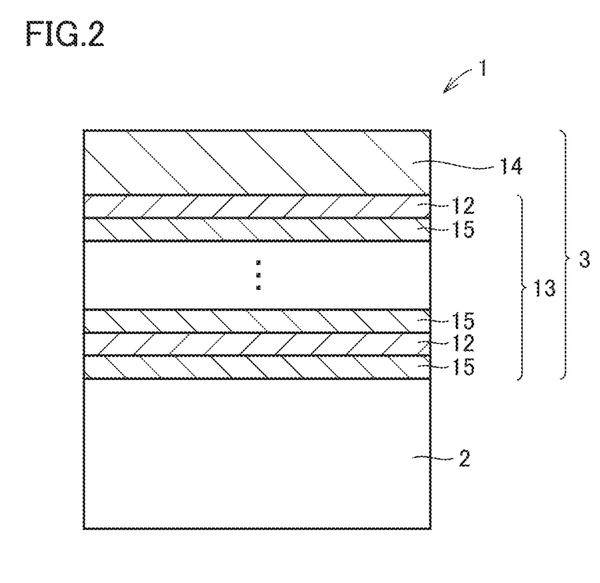
FIG. 2 is an enlarged schematic sectional view of an examples of the cutting tool according to Embodiment 1.

Either the first unit layer or the second unit layer may be disposed the nearest to the substrate. In FIG. 1, a first unit layer 12 is disposed directly on substrate 2, namely the nearest to substrate 2. In FIG. 2, a second unit layer 15 is disposed directly on substrate 2, namely the nearest to substrate 2. Either the first unit layer 12 or the second unit layer 15 may be disposed nearest to the surface of coating 3. In FIG. 1, a second unit layer 15 is disposed nearest to the surface of coating 3. In FIG. 2, a first unit layer 12 is disposed nearest to the surface of coating 3.

<Thickness of First Layer>

The first layer may have a thickness of 0.4 μm or more and 12 μm or less, 0.5 μm or more and 10 μm or less, 1 μm or more and 8 μm or less, or 2 μm or more and 5 μm or less. If the first layer has a thickness of 0.5 μm or more, the first layer is high in abrasion resistance, and the life of the cutting tool can be further extended.

Meanwhile, if the first layer has a thickness of 10 μm or less, the coating is less likely to chip in the early stage of cutting, and the life of the cutting tool can be further extended.

<Compositions of First Unit Layer and Second Unit Layer>

The first unit layer is composed of $Al_aTi_{(1-a-b)}Si_bN$, and satisfies $0.50 \leq a \leq 0.75$, and $0.005 \leq b \leq 0.20$.

a may be 0.500 or more and 0.750 or less, 0.550 or more and 0.700 or less, or 0.600 or more and 0.650 or less.

b may be 0.005 or more and 0.200 or less, 0.010 or more and 0.150 or less, or 0.020 or more and 0.100 or less.

(1-a-b) is 0.05 or more and 0.495 or less, and may be 0.100 or more and 0.450 or less, or 0.200 or more and 0.400 or less.

The second unit layer is composed of $Al_cCr_{(1-c-d)}Cu_dN$, and satisfies $0.50 \leq c \leq 0.85$, and $0.005 \leq d < 0.10$.

c is 0.500 or more and 0.850 or less, and may be 0.550 or more and 0.800 or less, or 0.600 or more and 0.750 or less.

d may be 0.005 or more and 0.100 or less, 0.010 or more and 0.090 or less, or 0.020 or more and 0.080 or less.

(1-c-d) is 0.05 or more and 0.495 or less, and may be 0.100 or more and 0.450 or less, or 0.200) or more and 0.400 or less.

b/d may be 1 or more, more than 1, 1 or more and 30 or less, 1.1 or more and 20 or less, 1.25 or more and 10 or less, or 2 or more and 5 or less. If b/d is 1 or more, the film hardness is improved, and the tool life is improved.

In the present disclosure, the expression "the first unit layer is composed of $Al_aTi_{(1-a-b)}Si_bN$" means that as long as the effect of the present disclosure is not deteriorated, the first unit layer can contain inevitable impurities besides $Al_aTi_{(1-a-b)}Si_bN$. In the present disclosure, the expression "the second unit layer is composed of $Al_cCr_{(1-c-d)}Cu_dN$" means that as long as the effect of the present disclosure is not deteriorated, the second unit layer can contain inevitable impurities besides $Al_cCr_{(1-c-d)}Cu_dN$. Examples of the inevitable impurities include oxygen and carbon. The total content of the inevitable impurities in the first unit layer or the second unit layer may be more than 0% by atom and less than 1% by atom. In the present disclosure, the term "% by atom" means the ratio of the number of atoms to the total number of atoms constituting the layer (%).

a, b, c, d, the content of the inevitable impurities in the first unit layer, and the content of the inevitable impurities in the second unit layer are measured by the elemental analysis of the cross section of the coating through a transmission electron microscope (TEM). The specific measuring method is as follows. A cutting tool is cut in the direction along the normal line of the coating to provide a thin section sample including the cross section of the coating. The thin section sample is irradiated with an electron beam using an EDS (energy-dispersive X-ray spectroscope) attached to the TEM. The energy of the characteristic X-rays generated at that time and the numbers of the characteristic X-rays generated are measured to subject the first unit layer and the second unit layer to elemental analysis. Five layers are randomly selected from the first unit layers, and five layers are randomly selected from the second unit layers. The layers are subjected to elemental analysis. The average composition of the five first unit layers is determined. The average composition corresponds to the composition of the first unit layer. The average composition of the five second unit layer is determined. The average composition corresponds to the composition of the second unit layer. It has been confirmed that as long as the identical cutting tool is measured, the results of measurement do not vary even at randomly selected measurement points.

In the composition of the first unit layer $Al_aTi_{(1-a-b)}Si_bN$, in the present disclosure, the ratio $A_{N1}/A_{M1}$ of the number of N atoms $A_{N1}$ to the total number of Al, Ti, and Si atoms $A_{M1}$ is necessarily in the range of 0.8 to 1.2 on the production thereof. In the composition of the second unit layer $Al_cCr_{(1-c-d)}Cu_dN$, in the present disclosure, the ratio $A_{N2}/A_{M2}$ of the number of N atoms $A_{N2}$ to the total number of Al, Cr, and Cu atoms $A_{M2}$ is necessarily in the range of 0.8 to 1.2 on the production thereof. The ratio $A_{N1}/A_{M1}$ and the ratio $A_{N2}/A_{M2}$ can be measured by Rutherford backscattering spectroscopy (RBS). It has been confirmed that if the above-mentioned ratios $A_{N1}/A_{M1}$ and ratio $A_{N2}/A_{M2}$ are in the ranges, the effect of the present disclosure is not deteriorated.

<Average Thickness of First Unit Layer and Average Thickness of Second Unit Layer>

An average thickness of the first unit layer is 2 nm or more and 50 nm or less, and an average thickness of the second unit layer is 2 nm or more and 50 nm or less. This enables further suppressing the progress of cracks occurring on the surface of the coating. The first unit layer may have an average thickness of 2 nm or more and 40 nm or less, 2 nm or more and 30 nm or less, or 4 nm or more and 25 nm or less. The second unit layer may have an average thickness of 2 nm or more and 40 nm or less, 2 nm or more and 30 nm or less, or 4 nm or more and 25 nm or less.

The method for measuring the average thickness of the first unit layer and the average thickness of the second unit layer is as follows. Five layers are randomly selected from the first unit layers, and five layers are randomly selected from the second unit layers. The thicknesses thereof are measured by the same method as the method for measuring the thickness of the first layer. The average thickness of the five first unit layers is calculated. The average thickness corresponds to the average thickness of the first unit layer. The average thickness of the five second unit layers is calculated. The average thickness corresponds to the average thickness of the second unit layer.

Figure 5:
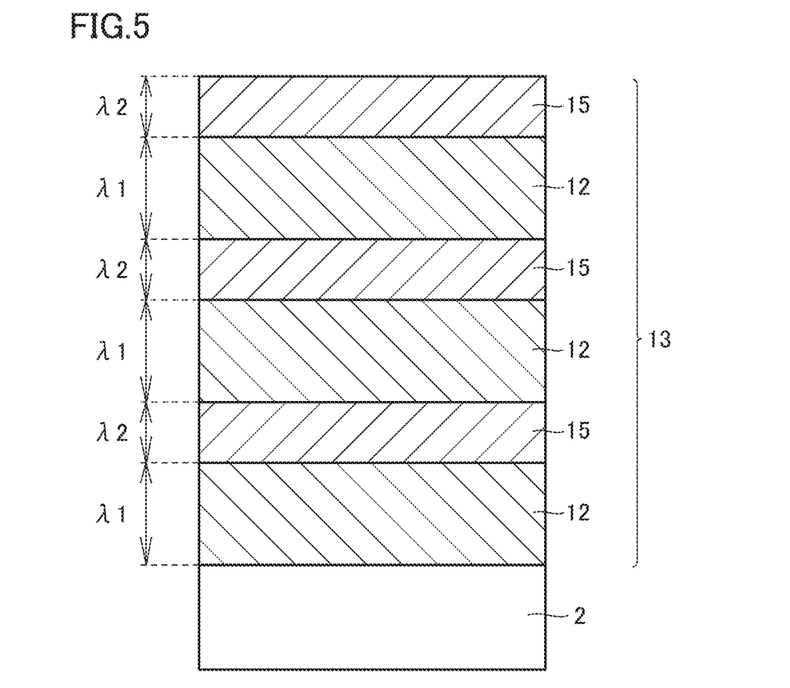
FIG. 5 is a figure for describing an example of the ratio of the thickness of a first unit layer to the thickness of a second unit layer.

As shown in FIG. 5, in first unit layer 12 and second unit layer 15 adjacent to first unit layer 12, the ratio λ1/λ2 of the thickness of first unit layer 12, λ1 to the thickness of second unit layer 15, λ2, may be 1 or more, more than 1, 1 or more and 5 or less, more than 1 and 5 or less, 1.1 or more and 4 or less, 1.2 or more and 3.8 or less, or 1.5 or more and 2.5 or less. If the ratio λ1/λ2 is more than 1, the rate of the first unit layer in the coating increases relatively, so that an increase in the amount of silicon in the coating improves the oxidation resistance and the hardness of the cutting tool as a whole.

The method for measuring λ1/λ2 is as follows. A combination of a first unit layer and a second unit layer adjacent thereto is randomly selected five times so that any selected unit layer is not selected again. In each combination, the thickness of the first unit layer λ1 and the thickness of the second unit layer λ2 are measured by the same method for measuring the thickness of the first layer to calculate a first λ1/λ2. The average of the five first λ1/λ2 is calculated. In the present disclosure, the average corresponds to λ1/λ2.

In FIG. 5, all the thicknesses of three first unit layers 12 are indicated as λ1, and all the thicknesses of three second unit layers 15 are indicated as λ2 for description. As long as the first unit layer and the second unit layer adjacent thereto satisfy the above-mentioned relationship of λ1/λ2, the thicknesses of all first unit layers 12, λ1, do not need to be identical, and the thicknesses of all second unit layers 15, λ2, do not need to be identical.

In the first layer, the total stack number of the first unit layers and the second unit layers may be 10 or more and 3000 or less. In this case, stacking the first unit layer and the second unit layer enables obtaining the effect of improving the hardness and the lubricity of the coating in a balanced manner sufficiently. In the first layer, the total stack number of the first unit layers and the second unit layers may be 100 or more and 2500 or less, or 200 or more and 2000 or less. For example, if 500 first unit layers and 500 second unit layers are present in the first layer, the total stack number of the first unit layers and the second unit layers is 1000.

In the first layer, a thin section sample including a cross section of the coating can be observed through a TEM (transmission electron microscope) at an observation magnification of 20000 to 500000 to determine the stack number of the first unit layer and the stack number of the second unit layer.

<Second Layer>

Figure 3:
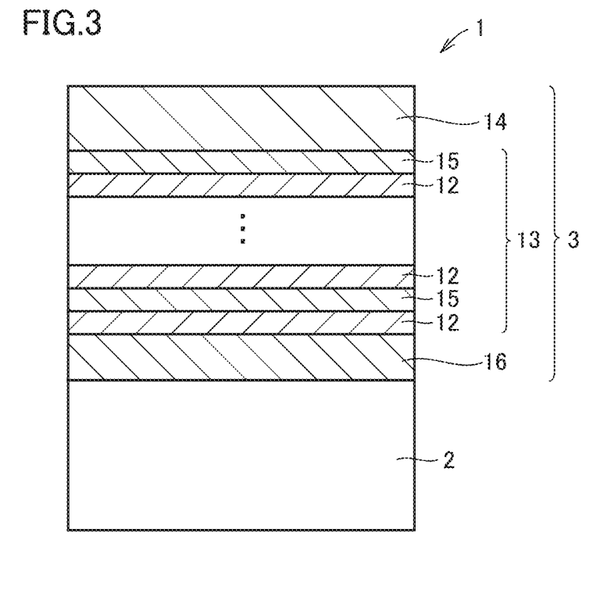
FIG. 3 is an enlarged schematic sectional view of an examples of the cutting tool according to Embodiment 1
Figure 4:
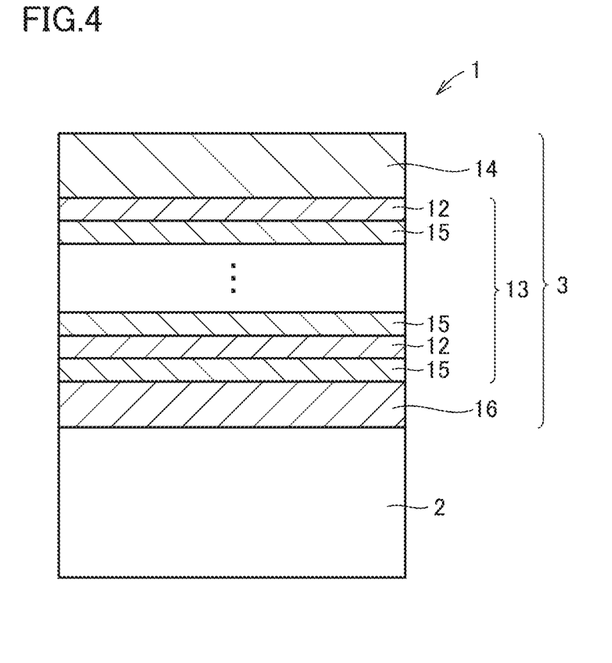
FIG. 4 is an enlarged schematic sectional view of an examples of the cutting tool according to Embodiment 1.

As shown in FIGS. 3 and 4, coating 3 may further comprise a second layer 16 disposed between substrate 2 and first layer 13. Second layer 16 may be disposed directly on the substrate.

The second layer can be composed of the first compound consisting of at least one element selected from the first group consisting of Group 4, 5, and 6 elements in the periodic table, aluminum (Al), and silicon (Si) or consisting of at least one element selected from the first group and at least one element selected from the second group consisting of carbon (C), nitrogen (N), oxygen (O), and boron (B). Examples of the Group 4 elements in the periodic table include titanium (Ti), zirconium (Zr), and hafnium (Hi). Examples of the Group 5 elements in the periodic table include vanadium (V), niobium (Nb), and tantalum (Ta). Examples of the Group 6 elements in the periodic table include chromium (Cr), molybdenum (Mo), and tungsten (W). The second layer enables enhancing the adhesion between the substrate and the coating, and improves the tool life. As long as the effect of the present disclosure is not deteriorated, the second layer can contain inevitable impurities besides at least one element selected from the first group or the first compound.

The second layer can be composed of the first compound consisting of at least one element selected from a first A group consisting of Cr, Al, Ti, and Si or consisting of at least one element selected from the first A group and at least one element selected from the second group consisting of carbon, nitrogen, oxygen, and boron.

Examples of the first compound include TiWCN, TiN, TiAlN, TiAlON, Al$_2$O$_3$, TiAlSiN, TiCrSiN, TiAlCrSiN, AlCrN, AlCrO, AlCrON, AlCrSiN, AlCrBN, TiZrN, TiAlMoN, TiAlNbN, TiSiN, AlCrTaN, AlVN, AlTiVN, TiB$_2$, TiCrHfN, CrSiWN, TiAlCN, TiSiCN, AlZrON, AlCrCN, AlHfN, CrSiBON, TiAlWN, AlCrMoCN, TiCN, TiCON, ZrN, and ZrCN.

As long as the effect of the present embodiment is not deteriorated, the thickness of the second layer is not particularly limited, and can be, for example, 0.1 μm or more and 2 μm or less.

<Third Layer>

As shown in FIGS. 1 to 4, coating 3 may further comprise a third layer 14 disposed on the opposite side of first layer 13 to substrate 2. Third layer 14 may be disposed directly on first layer 13. Other layers may be disposed between first layer 13 and third layer 14. Third layer 14 may be the outermost layer.

The third layer can be composed of a second compound consisting of at least one element selected from the first group consisting of Group 4, 5, and 6 elements in the periodic table, aluminum (Al), and silicon (Si) or consisting of at least one element selected from the first group and at least one element selected from the second group consisting of carbon (C), nitrogen (N), oxygen (O), and boron (B). The third layer enables reducing the coefficient of friction of the coating to extend the life of the cutting tool. As long as the effect of the present disclosure is not deteriorated, the third layer can contain impurities besides at least one element selected from the first group or the above-mentioned second compound.

The third layer can be composed of the second compound consisting of at least one element selected from a first A group consisting of Cr, Al, Ti, and Si or consisting of at least one element selected from the first A group and at least one element selected from the second group consisting of carbon, nitrogen, oxygen, and boron.

Examples of the second compound include AlTiBN, TiAlN, TiAlON, Al$_2$O$_3$, TiAlSiN, TiCrSiN, TiAlCrSiN, AlCrN, AlCrO, AlCrON, AlCrSiN, AlCrBN, TiZrN, TiAlMoN, TiAlNbN, TiSiN, AlCrTaN, AlVN, AlTiVN, TiB$_2$, TiCrHfN, CrSiWN, TiAlCN, TiSiCN, AlZrON, AlCrCN, AlHfN, CrSiBON, TiAlWN, AlCrMoCN, TiCN, TiCON, ZrN, and ZrCN.

The third layer may have a thickness of 0.1 μm or more and 2 μm or less. If the third layer has a thickness of 0.1 μm or more, the effect of imparting lubricity due to the third layer is easily obtained. Although the upper limit of a thickness of the third layer is not particularly limited, in the case of more than 2 μm, the above-mentioned effect of imparting lubricity tends not to be able to be further improved. The third layer may have a thickness of 2 μm or less in view of cost.

<Intermediate Layer>

The coating can comprise an intermediate layer disposed between the third layer and the first layer or between the first layer and the second layer. Examples of the intermediate layer include TiAlCeN, AlTiN, AlTiBN, AlTiSiN, AlTiYN, and AlTiLaN.

The intermediate layer may have a thickness of 0.1 μm or more and 2 μm or less, 0.3 μm or more and 1.5 μm or less, or 0.4 μm or more and 1.0 μm or less.

Embodiment 2. Method for Manufacturing Cutting Tool

In Embodiment 2, the method for manufacturing the cutting tool of Embodiment 1 will be described. The manufacturing method comprises the first step of providing a substrate and the second step of forming a coating on the substrate.

The second step comprises a step of forming a first layer. Details of the steps will be described below.

<First Step>

In the first step, the substrate is provided. The substrate described in Embodiment 1 can be used as the substrate. Any conventionally known substrate can be provided.

<Second Step>

In the second step, the coating is formed on the substrate. The second step comprises the step of forming the first layer In the step of forming the first layer, first unit layer and second unit layer are alternately stacked by physical vapor deposition (PVD) to form the first layer. It is highly effective to form a layer comprising a highly crystalline compound for improving the abrasion resistance of the coating comprising the first layer. The present inventors have examined various methods as the method for forming the first layer and consequently found that it is highly effective to use physical vapor deposition.

As the PVD, at least one selected from the group consisting of cathode arc ion plating, balanced magnetron sputtering, unbalanced magnetron sputtering, and HiPIMS is usable. Especially cathode arc ion plating, which ionizes raw material elements at a high ionization rate, may be used. Since the use of cathode arc ion plating enables the metal ion bombardment treatment of the surface of the substrate before the formation of the first layer, the adhesion between the substrate and the coating comprising the first layer is remarkably improved.

Cathode arc ion plating can be performed, for example, in a procedure involving disposing a substrate and a target as the cathode in an apparatus, then impressing high voltage on the target for arcing to ionize atoms constituting the target, resulting in vaporization, and depositing the substance on the substrate.

<Other Steps>

The second step can comprise steps of surface processing such as surface grinding and shot blasting besides the step of forming the first layer. The second step can comprise steps of forming other layers such as the second layer, the third layer, and the intermediate layer. The other layers can be formed by conventionally known chemical vapor deposition or physical vapor deposition. The other layers may be formed by physical vapor deposition from the viewpoint that the first layer and the other layers can be successively formed in a physical vapor deposition apparatus.

EXAMPLES

The present embodiment will be further specifically described by Examples.

The present embodiment is not, however, limited by these Examples.

<<Manufacturing of Cutting Tool>>

Figure 6:
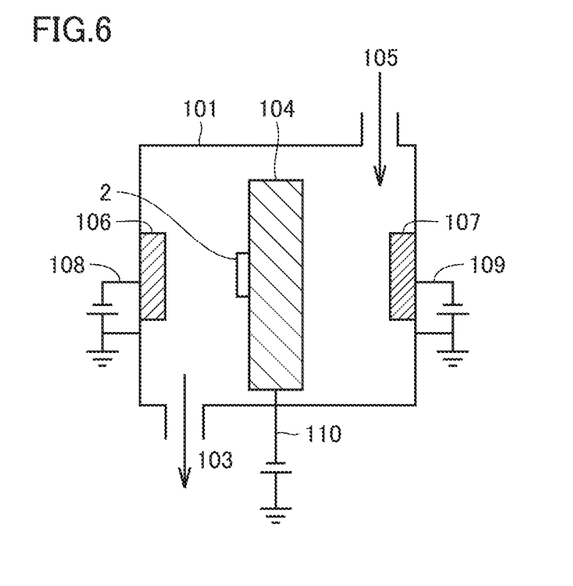
FIG. 6 is a schematic sectional view of a cathode arc ion plating apparatus used in Examples.
Figure 7:
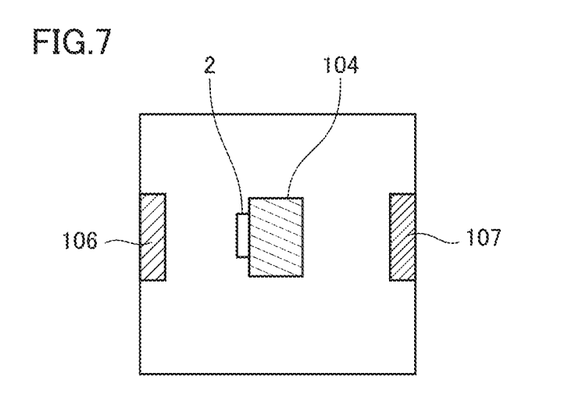
FIG. 7 is a schematic top view of the cathode arc ion plating apparatus shown in FIG. 6.

FIG. 6 is a schematic sectional view of a cathode arc ion plating apparatus used in the present Examples. FIG. 7 is a schematic top view of the apparatus in FIG. 6.

The apparatus in FIGS. 6 and 7 includes a chamber 101 provided with a cathode 106 for first unit layer and a cathode 107 for second unit layer as alloy targets to be used as metal raw materials for a coating, and a rotational substrate holder 104 for disposing a substrate thereon. The compositions of cathodes 106 and 107 are adjusted so that the compositions described in the following Tables 1 and 2 are obtained.

In an apparatus for a sample on which a second layer or a third layer is formed, a cathode for the second layer (not shown) or a cathode for the third layer (not shown) are also further installed in a chamber 101. The cathode for the second layer and the cathode for the third layer have compositions adjusted so that the compositions described in the following Tables 3 and 4 are obtained.

An arc power source 108 is attached to cathode 106, and an arc power source 109 is attached to cathode 107. A bias power source 110 is attached to substrate holder 104. Chamber 101 is provided with a gas inlet for introducing gas 105 and a gas outlet 103 for adjusting the pressure in chamber 101. The apparatus has a structure in which the gas in chamber 101 can be aspirated from gas outlet 103 with a vacuum pump A four-blade ball end mill with a ball radius of 5 mm made of a K20-grade cemented carbide in accordance with JIS was attached to substrate holder 104 as the substrate.

While the pressure was reduced with a vacuum pump in chamber 101, the substrate being rotated was then heated to a temperature of 500° C. with a heater installed in the apparatus. The chamber 101 was evacuated to a pressure of $1.0 \times 10^{-4}$ Pa. Argon gas was then introduced from the gas inlet to maintain the pressure in the chamber 101 at 2.0 Pa. While the voltage from the bias power source 110 was gradually increased to −1000 V, the surface of the substrate was cleaned for 15 minutes.

The argon gas was then exhausted from the chamber 101 to clean the substrate (argon bombardment treatment). A substrate for cutting tools as samples was provided by the above procedure.

Then, while nitrogen was introduced as reactive gas with the substrate being rotated at the center, cathode 106 and cathode 107 were each supplied with an arc current of ISO A under the following conditions to generate metal ions from cathode 106 and cathode 107, resulting in the formation of a first layer comprising the first unit layer and the second unit layer having the compositions shown in the following Tables 1 and 2 on the substrate with the substrate maintained at a temperature of 550° C., the reactive gas maintained at a pressure of 2.0 Pa, and the voltage from bias power source 110 maintained at a certain constant value in the range of −50 V to −300 V.

If the second layer was formed, the second layer was formed on the substrate, and the first layer was then formed on the second layer. The second layer was formed in the following procedure. The substrate temperature was set at 550° C., and the gas pressure in the apparatus was set at 3.0 Pa. A mixed gas of nitrogen gas and argon gas was introduced as the reactive gas. The cathode electrode was then supplied with an arc current of 150 A. The supply of the arc current generated metal ions and the like from the arc evaporation source to form the second layer.

If the third layer was formed, the third layer was formed on the first layer. The third layer was formed in the following procedure. The substrate temperature was set at 550° C., and the gas pressure in the apparatus was set at 3.0 Pa. A mixed gas of nitrogen gas and argon gas or of nitrogen gas and oxygen gas was introduced as the reactive gas. The cathode electrode was then supplied with an arc current of 150 A. The supply of the arc current generated metal ions and the like from the arc evaporation source to form the third layer.

Cutting tools as samples were manufactured by the above-mentioned method

TABLE 1

| | First layer | | | | | | | | | |
|---|---|---|---|---|---|---|---|---|---|---|
| | First unit layer $Al_aTi_{(1-a-b)}Si_bN$ | | | Second unit layer $Al_cCr_{(1-c-d)}Cu_dN$ | | | | | | |
| Sample No. | a | b | Average thickness [nm] | c | d | Average thickness [nm] | b/d | $\lambda 1/\lambda 2$ | Stack number | Thickness [µm] |
| 1 | 0.500 | 0.160 | 43 | 0.500 | 0.050 | 35 | 3.2 | 1.2 | 179 | 7.0 |
| 2 | 0.600 | 0.100 | 26 | 0.560 | 0.008 | 20 | 12.5 | 1.3 | 217 | 5.0 |
| 3 | 0.750 | 0.080 | 33 | 0.670 | 0.040 | 28 | 2.0 | 1.2 | 131 | 4.0 |
| 4 | 0.550 | 0.005 | 40 | 0.580 | 0.010 | 34 | 0.5 | 1.2 | 135 | 5.0 |
| 5 | 0.540 | 0.010 | 10 | 0.560 | 0.060 | 4 | 0.2 | 2.5 | 1143 | 8.0 |
| 6 | 0.560 | 0.100 | 32 | 0.570 | 0.050 | 32 | 2.0 | 1.0 | 125 | 4.0 |
| 7 | 0.570 | 0.200 | 36 | 0.590 | 0.070 | 30 | 2.9 | 1.2 | 152 | 5.0 |
| 8 | 0.590 | 0.010 | 20 | 0.500 | 0.010 | 14 | 1.0 | 1.4 | 118 | 2.0 |
| 9 | 0.640 | 0.050 | 4 | 0.700 | 0.020 | 2 | 2.5 | 2.0 | 3000 | 9.0 |
| 10 | 0.720 | 0.090 | 34 | 0.850 | 0.070 | 28 | 1.3 | 1.2 | 194 | 6.0 |
| 11 | 0.710 | 0.180 | 32 | 0.830 | 0.005 | 30 | 36.0 | 1.1 | 129 | 4.0 |
| 12 | 0.650 | 0.100 | 36 | 0.740 | 0.010 | 30 | 10.0 | 1.2 | 212 | 7.0 |
| 13 | 0.510 | 0.008 | 49 | 0.830 | 0.100 | 50 | 0.1 | 1.0 | 81 | 4.0 |
| 14 | 0.710 | 0.015 | 2 | 0.640 | 0.060 | 2 | 0.3 | 1.0 | 2500 | 5.0 |
| 15 | 0.560 | 0.060 | 30 | 0.680 | 0.005 | 30 | 12.0 | 1.0 | 100 | 3.0 |
| 16 | 0.580 | 0.190 | 50 | 0.690 | 0.050 | 50 | 3.8 | 1.0 | 60 | 3.0 |
| 17 | 0.730 | 0.016 | 42 | 0.610 | 0.060 | 36 | 1.1 | 1.2 | 231 | 9.0 |
| 18 | 0.630 | 0.100 | 42 | 0.680 | 0.100 | 36 | 0.8 | 1.2 | 128 | 5.0 |
| 19 | 0.550 | 0.007 | 43 | 0.690 | 0.090 | 37 | 0.1 | 1.5 | 150 | 6.0 |
| 20 | 0.650 | 0.100 | 42 | 0.610 | 0.005 | 36 | 20.0 | 1.1 | 51 | 2.0 |
| 21 | 0.550 | 0.040 | 11 | 0.830 | 0.010 | 5 | 4.0 | 0.8 | 875 | 7.0 |
| 22 | 0.540 | 0.130 | 17 | 0.620 | 0.040 | 11 | 3.3 | 1.5 | 36 | 0.5 |
| 23 | 0.500 | 0.006 | 11 | 0.670 | 0.005 | 10 | 1.2 | 1.1 | 952 | 10 |
| 24 | 0.550 | 0.012 | 13 | 0.520 | 0.080 | 7 | 0.2 | 1.9 | 40 | 0.4 |
| 25 | 0.500 | 0.050 | 50 | 0.640 | 0.070 | 44 | 0.7 | 1.1 | 255 | 12 |
| 26 | 0.530 | 0.020 | 29 | 0.730 | 0.080 | 23 | 0.3 | 1.3 | 385 | 10.0 |
| 27 | 0.570 | 0.006 | 17 | 0.660 | 0.060 | 11 | 0.1 | 1.5 | 214 | 3.0 |

TABLE 2

| | First layer | | | | | | | | | |
|---|---|---|---|---|---|---|---|---|---|---|
| | First unit layer $Al_aTi_{(1-a-b)}Si_bN$ | | | Second unit layer $Al_cCr_{(1-c-d)}Cu_dN$ | | | | | | |
| Sample No. | a | b | Average thickness [nm] | c | d | Average thickness [nm] | b/d | $\lambda 1/\lambda 2$ | Stack number | Thickness [µm] |
| 1-1 | 0.400 | 0.150 | 21 | 0.650 | 0.060 | 15 | 2.5 | 1.4 | 333 | 6.0 |
| 1-2 | 0.800 | 0.011 | 40 | 0.840 | 0.100 | 34 | 0.1 | 1.2 | 243 | 9.0 |
| 1-3 | 0.580 | 0.004 | 31 | 0.510 | 0.010 | 25 | 0.4 | 1.2 | 321 | 8.0 |
| 1-4 | 0.730 | 0.220 | 8 | 0.650 | 0.050 | 2 | 4.4 | 4.0 | 800 | 4.0 |
| 1-5 | 0.630 | 0.150 | 44 | 0.400 | 0.010 | 38 | 15.0 | 1.2 | 49 | 2.0 |
| 1-6 | 0.550 | 0.009 | 39 | 0.900 | 0.007 | 33 | 1.3 | 1.2 | 278 | 10.0 |
| 1-7 | 0.650 | 0.005 | 32 | 0.530 | 0.004 | 26 | 1.3 | 1.2 | 138 | 4.0 |
| 1-8 | 0.550 | 0.040 | 50 | 0.820 | 0.120 | 44 | 0.3 | 1.1 | 128 | 6.0 |
| 1-9 | 0.540 | 0 | 47 | 0.730 | 0 | 44 | — | 1.1 | 110 | 5.0 |
| 1-10 | 0.530 | 0.100 | 22 | 0.610 | 0 | 20 | — | 1.1 | 333 | 7.0 |
| 1-11 | 0.570 | 0 | 42 | 0.550 | 0.010 | 42 | 0.0 | 1.0 | 95 | 4.0 |

TABLE 3

| | Second layer | | Third layer | | Thickness of coating [µm] | Cutting test Cutting distance [m] |
|---|---|---|---|---|---|---|
| Sample No. | Composition | Thickness [µm] | Composition | Thickness [µm] | | |
| 1 | — | — | — | — | 7.0 | 15.0 |
| 2 | — | — | — | — | 5.0 | 17.0 |
| 3 | — | — | — | — | 4.0 | 16.0 |
| 4 | — | — | — | — | 5.0 | 15.0 |

TABLE 3-continued

| Sample No. | Second layer Composition | Thickness [μm] | Third layer Composition | Thickness [μm] | Thickness of coating [μm] | Cutting test Cutting distance [m] |
|---|---|---|---|---|---|---|
| 5 | — | — | — | — | 8.0 | 15.5 |
| 6 | — | — | — | — | 4.0 | 16.0 |
| 7 | AlTiBN | 1 | AlCrON | 1 | 7.0 | 19.0 |
| 8 | AlTiN | 0.3 | — | — | 2.3 | 17.0 |
| 9 | TiSiN | 0.5 | — | — | 8.5 | 18.0 |
| 10 | — | — | TiSiCN | 1 | 7.0 | 17.0 |
| 11 | — | — | — | — | 4.0 | 13.5 |
| 12 | — | — | — | — | 7.0 | 15.5 |
| 13 | — | — | — | — | 4.0 | 12.0 |
| 14 | — | — | — | — | 5.0 | 15.0 |
| 15 | — | — | — | — | 3.0 | 15.0 |
| 16 | — | — | — | — | 3.0 | 15.5 |
| 17 | — | — | — | — | 9.0 | 13.5 |
| 18 | — | — | — | — | 5.0 | 15.0 |
| 19 | AlTiN | 1 | — | — | 7.0 | 15.5 |
| 20 | — | — | TiSiN | 1 | 3.0 | 15.0 |
| 21 | — | — | TiCN | 2 | 9.0 | 16.0 |
| 22 | — | — | — | — | 0.5 | 13.0 |
| 23 | — | — | — | — | 10 | 15.5 |
| 24 | — | — | — | — | 0.4 | 12.0 |
| 25 | — | — | — | — | 12 | 13.0 |
| 26 | AlTiBN | 5 | — | — | 15 | 12.0 |
| 27 | — | — | TiSiN | 17 | 20 | 10.0 |

TABLE 4

| Sample No. | Second layer Composition | Thickness [μm] | Third layer Composition | Thickness [μm] | Thickness of coating [μm] | Cutting test Cutting distance [m] |
|---|---|---|---|---|---|---|
| 1-1 | — | — | — | — | 6.0 | 5.0 |
| 1-2 | — | — | — | — | 9.0 | 5.0 |
| 1-3 | — | — | — | — | 9.0 | 7.0 |
| 1-4 | — | — | — | — | 4.0 | 6.0 |
| 1-5 | — | — | — | — | 2.0 | 5.0 |
| 1-6 | — | — | — | — | 10.0 | 3.0 |
| 1-7 | — | — | — | — | 4.0 | 6.0 |
| 1-8 | — | — | — | — | 6.0 | 4.0 |
| 1-9 | — | — | — | — | 5.0 | 5.0 |
| 1-10 | — | — | — | — | 7.0 | 6.0 |
| 1-11 | — | — | — | — | 4.0 | 5.0 |

<<Evaluation>>
<Measurement of Compositions of First Unit Layer and Second Unit Layer>

The cutting tools as the samples were measured for the compositions of the first unit layer and the second unit layer by the method described in Embodiment 1. Tables 1 and 2 show the values of a, b, c, and d in the first unit layer $Al_aTi_{(1-a-b)}Si_bN$ and the second unit layer $Al_cCr_{(1-c-d)}Cu_dN$. Tables 1 and 2 further show b/d.

<Measurement of Compositions of Second Layer and Third Layer>

The cutting tools as the samples were measured for the compositions of the second layers and the third layers by the method described in Embodiment 1. Tables 3 and 4 show the results. The described signs "-" mean that the corresponding layers were absent.

<Measurement of Average Thicknesses of First Unit Layer and Second Unit Layer and Thicknesses of First Layer, Second Layer, and Third Layer>

The cutting tools as the samples were measured for the average thicknesses of the first unit layer and the second unit layer and the thicknesses of the first layer, the second layer, and the third layer by the method described in Embodiment 1. Tables 1 to 4 show the results.

<Measurement of λ1/λ2>

The ratio of the thickness of the first unit layer 12, λ1, to the thickness of the second unit layer 15 adjacent thereto, λ2, λ1/λ2 in the first unit layer and the second unit layer adjacent thereto, was determined by the method described in Embodiment 1 in each of the cutting tools as the samples. Tables 1 and 2 show the obtained results.

<Measurement of Stack Number>

The total stack numbers of the first unit layers and the second unit layers were determined by the method described in Embodiment 1 in the cutting tools as the samples Tables 1 and 2 show the results. For example, if the stack number is described as 100, this means that 50 first unit layers and 50 second unit layers are stacked. If the stack number is described as 667, 334 first unit layers and 333 second unit layers were stacked.

<Crystal Structure of Coating>

The crystal structures of the coatings were analyzed by the method described in Embodiment 1 in the cutting tool as the samples. The Samples 1 to 27 had cubic crystal structures.

<Hardness of Coating>

The hardnesses of the coatings were analyzed by the method described in Embodiment 1 in the cutting tools as the samples. In the Samples 1 to 27, the hardnesses of the coatings were 30 GPa or more and 50 GPa or less.

<Cutting Test>

A material to be cut was subjected to side machining tests with the cutting tools as the samples under the following conditions. The cutting distances were measured until the abrasion widths or the breakage widths of the cutting edges reached 100 µm. Table 2 shows the results. A long cutting distance means a long tool life.

<<Cutting Conditions>>

Material to be cut: Inconel 718
Cutting speed Vc: 60 n/min
Feed speed fz: 0.05 mm/t
Depth of cut: ap=3.0 mm, ae=1.0 mm
Oil is externally supplied.

The above-mentioned cutting conditions correspond to conditions for the high-efficiency machining of nickel-based alloy.

The cutting tools as Samples 1 to 27 corresponds to Examples, and the cutting tools as Samples 1-1 to 1-11 corresponds to Comparative Examples. It was confirmed that the cutting tools as Samples 1 to 27 had a long tool life as compared with the cutting tools as Samples 1-1 to 1-11 in the high-efficiency machining of nickel-based alloy.

As mentioned above, the embodiments and Examples of the present disclosure were described, but the above-mentioned configurations of the embodiments and Examples have been expected to be appropriately combined or variously modified since the beginning.

The embodiments and Examples disclosed herein are illustrations in all respects, and should be considered to be unlimited. The scope of the present invention is indicated by Claims rather than the above-mentioned embodiments and Examples, and is intended to include any modifications within the scope and meaning equivalent to Claims.

REFERENCE SIGNS LIST

1 Cutting tool; 2 Substrate; 3 Coating; 12 First unit layer; 13 First layer; 14 Third layer; 15 Second unit layer; 16 Second layer; 101 Chamber; 103 Gas outlet; 104 Substrate holder; 105 Gas; 106, 107 Cathode; 108, 109 Arc power source; 110 Bias power source.

The invention claimed is:

1. A cutting tool, comprising a substrate and a coating disposed on the substrate,
wherein the coating comprises a first layer,
the first layer consists of an alternate layer in which a first unit layer and a second unit layer are alternately stacked,
the first unit layer is composed of $Al_a Ti_{(1-a-b)} Si_b N$,
the second unit layer is composed of $Al_c Cr_{(1-c-d)} Cu_d N$,
the a, the b, the c, and the d satisfy
$0.50 \leq a \leq 0.75$,
$0.005 \leq b \leq 0.20$,
$0.50 \leq c \leq 0.85$, and
$0.005 \leq d < 0.10$,
an average thickness of the first unit layer is 2 nm or more and 50 nm or less, and
an average thickness of the second unit layer is 2 nm or more and 50 nm or less.

2. The cutting tool according to claim 1, the b and the d satisfy a relationship: $b/d \geq 1$.

3. The cutting tool according to claim 1, wherein in the first unit layer and the second unit layer adjacent to the first unit layer, a ratio $\lambda 1/\lambda 2$ of thickness of the first unit layer $\lambda 1$ to thickness of the second unit layer $\lambda 2$, is more than 1.0.

4. The cutting tool according to claim 1, wherein the first layer has a thickness of 0.5 µm or more and 10 µm or less.

5. The cutting tool according to claim 1, wherein the coating further comprises a second layer disposed between the substrate and the first layer, and
the second layer is composed of a first compound
consisting of at least one element selected from a first group consisting of Group 4, 5, and 6 elements in the periodic table, aluminum, and silicon or
consisting of at least one element selected from the first group and at least one element selected from a second group consisting of carbon, nitrogen, oxygen, and boron.

6. The cutting tool according to claim 1, wherein the coating further comprises a third layer disposed on the opposite side of the first layer to the substrate, and
the third layer is composed of a second compound
consisting of at least one element selected from the first group consisting of Group 4, 5, and 6 elements in the periodic table, aluminum, and silicon or
consisting of at least one element selected from the first group and at least one element selected from the second group consisting of carbon, nitrogen, oxygen, and boron.

7. The cutting tool according to claim 1, wherein the coating has a thickness of 0.5 µm or more and 12 µm or less.

8. The cutting tool according to claim 1, wherein the substrate comprises a cemented carbide, a cermet, cubic boron nitride sintered material, diamond sintered material, high-speed steel, or a ceramic.

* * * * *